United States Patent
Behrens

(10) Patent No.: US 7,390,063 B2
(45) Date of Patent: Jun. 24, 2008

(54) SEAT STRUCTURE FOR A MOTOR VEHICLE SEAT

(75) Inventor: Meinhard Behrens, Obernkirchen (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 251 days.

(21) Appl. No.: 11/238,963

(22) Filed: Sep. 30, 2005

(65) Prior Publication Data
US 2006/0108491 A1    May 25, 2006

(30) Foreign Application Priority Data
Oct. 8, 2004    (DE)    .................... 10 2004 049 191

(51) Int. Cl.
A47C 7/00    (2006.01)
B60N 2/02    (2006.01)
F16M 13/00    (2006.01)

(52) U.S. Cl. .................... 297/440.1; 297/440.22; 296/65.13; 248/429

(58) Field of Classification Search ............ 297/452.18, 297/344.11, 440.22, 440.1, 440.15; 296/65.13, 296/65.14, 65.15, 65.03; 248/424, 429
See application file for complete search history.

(56) References Cited

U.S. PATENT DOCUMENTS

| | | | | |
|---|---|---|---|---|
| 5,240,310 | A * | 8/1993 | Rink | 297/452.18 |
| 5,330,245 | A * | 7/1994 | Boisset | 296/65.03 |
| 5,921,606 | A * | 7/1999 | Moradell et al. | 296/65.03 |
| 5,997,090 | A | 12/1999 | Baloche et al. | |
| 6,260,924 | B1 | 7/2001 | Jones et al. | |
| 6,488,249 | B1 * | 12/2002 | Girardi et al. | 248/429 |
| 2004/0075404 | A1 * | 4/2004 | Gerding et al. | 318/55 |
| 2005/0099041 | A1 * | 5/2005 | Becker et al. | 297/217.2 |
| 2006/0061184 | A1 * | 3/2006 | Jennings | 297/378.12 |
| 2006/0108491 | A1 * | 5/2006 | Behrens | 248/429 |
| 2006/0138842 | A1 * | 6/2006 | Behrens | 297/368 |

(Continued)

FOREIGN PATENT DOCUMENTS

DE    90 11 485.8    11/1990

(Continued)

OTHER PUBLICATIONS

German Patent Office Action dated Mar. 22, 2005 in German Application No. 10 2004 049 191.7-74, filed Oct. 8, 2004 (2 pages).

(Continued)

*Primary Examiner*—David R Dunn
*Assistant Examiner*—Kaitlin A Wilson
(74) *Attorney, Agent, or Firm*—Shlesinger, Arkwright & Garvey LLP.

(57) ABSTRACT

Seat structure for a motor vehicle seat includes upper rails, which are longitudinally displaceable relative to lower rails mounted fixedly to the motor vehicle that include longitudinal slots, and a seat frame, which includes insertion tabs, which are inserted in the longitudinal slots of the upper tracks. To facilitate a quick and secure assembly at a low cost, the seat frame includes a front and back crossbeam, on which the insertion tabs are present. The insertion tabs each include a notch, which engages an upper rail and fixes it vertically. The crossbeams are fixed longitudinally on the upper rails by formfitting fasteners, and a seat pan is fastened to the crossbeams.

14 Claims, 5 Drawing Sheets

U.S. PATENT DOCUMENTS

| | | | |
|---|---|---|---|
| 2006/0163932 A1* | 7/2006 | Bej | 297/410 |
| 2006/0175887 A1* | 8/2006 | Behrens | 297/452.18 |
| 2006/0273649 A1* | 12/2006 | Saberan | 297/452.18 |

FOREIGN PATENT DOCUMENTS

| | | |
|---|---|---|
| DE | 42 01 829 A1 | 6/1993 |
| DE | 196 00 789 C2 | 6/1993 |
| DE | 42 16 584 C2 | 11/1993 |
| DE | 44 00 911 A1 | 8/1994 |
| DE | 44 44 122 C1 | 4/1996 |
| DE | 196 35 740 A1 | 3/1997 |
| DE | 297 07 562 U1 | 10/1997 |
| DE | 197 24 554 A1 | 12/1998 |
| DE | 197 13 753 C2 | 2/2000 |
| DE | 198 82 413 T1 | 5/2000 |
| DE | 698 00 455 T2 | 6/2001 |
| DE | 100 26 530 A1 | 12/2001 |
| DE | 101 42 981 A1 | 3/2003 |
| DE | 101 60 929 A1 | 7/2003 |
| DE | 102 30 637 A1 | 1/2004 |
| DE | 103 01 283 B3 | 7/2004 |
| DE | 103 15 375 A1 | 11/2004 |
| EP | 0 901 934 A1 | 3/1999 |
| EP | 1 046 541 A1 | 10/2000 |
| JP | 10147166 A | 6/1998 |
| JP | 2001097099 A | 4/2001 |
| WO | 99/38723 | 8/1999 |
| WO | 01/89875 A1 | 11/2001 |

OTHER PUBLICATIONS

German Office Action dated Oct. 24, 2005 in German Application No. 10 2005 003 819.0-16, filed Jan. 27, 2005 (2 pages).

German Office Action dated Mar. 10, 2005 in German Application No. 10 2004 045 988.6-42, filed, Sep. 22, 2004 (3 pages).

German Office Action dated Dec. 6, 2005 in German Application No. 10 2005 005 485.4, filed Feb. 4, 2005 (3 pages).

* cited by examiner

SEAT STRUCTURE FOR A MOTOR VEHICLE SEAT

CROSS REFERENCE TO RELATED APPLICATIONS

This application claims priority of German application no. 10 2004 049 191.7, filed Oct. 8, 2004, which is incorporated herein by reference.

FIELD OF THE INVENTION

The invention relates to a seat structure for a vehicle seat. More particularly the invention relates to a seat structure for a vehicle seat including upper rails, which are longitudinally displaceable in relation to lower rails mounted fixedly to a motor vehicle and which include longitudinal slots, and seat frame, which includes insertion tabs, which are inserted in the longitudinal slots of the upper tracks. To facilitate a quick and secure assembly at a low cost, the seat frame includes a front and back crossbeam, on which the insertion tabs are provided. The insertion tabs each include a notch, which engages an upper rail and fixes it vertically. The crossbeams are fixed longitudinally on the upper rails by formfitting fasteners, and a seat pan is fastened to the crossbeams.

BACKGROUND OF THE INVENTION

Similar seat structures are known from EP 0 901 934 A1 and DE 698 00 455 T2. The seat frame is inserted via its insertion tabs into longitudinally running slots of an upper rail and fixed into position so that is held securely. Anchoring is provided by rods inserted transversally into the upper rails and by pivoting the locking latches.

With its insertion tab-engagement, an assembly of this type offers a higher level of stability than the securing base flanges to the upper rails with screws or rivets as is described JP 101 471 66 A. However, a considerably time-consuming and costly assembly is required. Furthermore, the insertion tabs with pivotable locking latches are relatively expensive to produce.

DE 100 26 530 A1 shows that it is possible to secure lower rails to the floor of a vehicle by means of front and back fixing means, wherein the rear fixing means is realized as a wedge flange, which rests in a specially made recess in the floor of the vehicle and is secured by a spring-loaded arresting means present in the floor of the vehicle. The vehicle seat itself is connected to the upper rails via front and back connecting rods.

OBJECTS AND SUMMARY OF THE INVENTION

An object of the invention is to produce a seat structure and a process for manufacturing the seat structure, which make possible a secure assembly requiring little labor and at a low cost.

The invention teaches that this object can be achieved through a seat structure according to the invention.

The invention includes a seat structure for a motor vehicle seat that includes upper rails, which are longitudinally displaceable relative to lower rails mounted fixedly to the motor vehicle and that include longitudinal slots, and a seat frame, which includes insertion tabs, which are inserted in the longitudinal slots of the upper tracks. To facilitate a quick and secure assembly at a low cost, the seat frame includes a front and back crossbeam, on which the insertion tabs are provided. The insertion tabs each include a notch, which engages an upper rail and fixes it vertically. The crossbeams are fixed longitudinally on the upper rails by formfitting fasteners or positive fit attachments, such as rivets, and a seat pan is fastened to the crossbeams.

The invention includes a process for assembling a seat structure of a vehicle seat, including steps of, for example: inserting front insertion tabs of a forward crossbeam and rear insertion tabs of a rear crossbeam into longitudinal slots provided on a longitudinally displaceable upper rail; shifting of the front and rear crossbeams longitudinally on the upper rails in such a manner that notches of the front and rear insertion tabs engage the upper rails and fix them in a vertical position; anchoring the front and rear crossbeams longitudinally through formfitting fasteners; and mounting and securing of a seat pan on the front and rear crossbeams.

Additional preferred embodiments in accordance with the invention are set forth above and below.

According to the invention the insertion tabs of the crossbeams may be inserted vertically into the longitudinal slit of the upper rails and are subsequently locked longitudinally in such a way that the upper rails are engaged in the insertion tabs and are fixed vertically. Each insertion tab includes a notch, preferably opening forwardly, which engages the upper rail when driven forwardly.

Transverse anchoring is advantageously already achieved through the insertion of the insertion tabs in the slots, wherein the crossbeam can include on each side multiple insertion tabs disposed in lateral relation to one another. Further longitudinal anchoring of the structure is provided by additional formfitting fasteners, e.g. rivets, which can simply be inserted from above through, for example, folded tabs of the crossbeam and openings or boreholes of the upper rails.

The seat pan can be secured to the crossbeams, preferably by inserting the insertion tabs or flanges of the seat pan in a crossbeam and pivoting the seat pan about this crossbeam and subsequently securing it on the other crossbeam through, for example, formfitting fasteners.

In this manner a quick and economical assembly is possible. The individual parts can hereby be economically manufactured from sheet metal through deep drawing or extrusion. By employing rivets as formfitting connection means, a quick assembly is possible.

BRIEF DESCRIPTION OF THE DRAWINGS

The invention is described in further detail with reference being made to the attached drawings of an embodiment, in which.

DETAILED DESCRIPTION OF THE INVENTION

Figure 1:
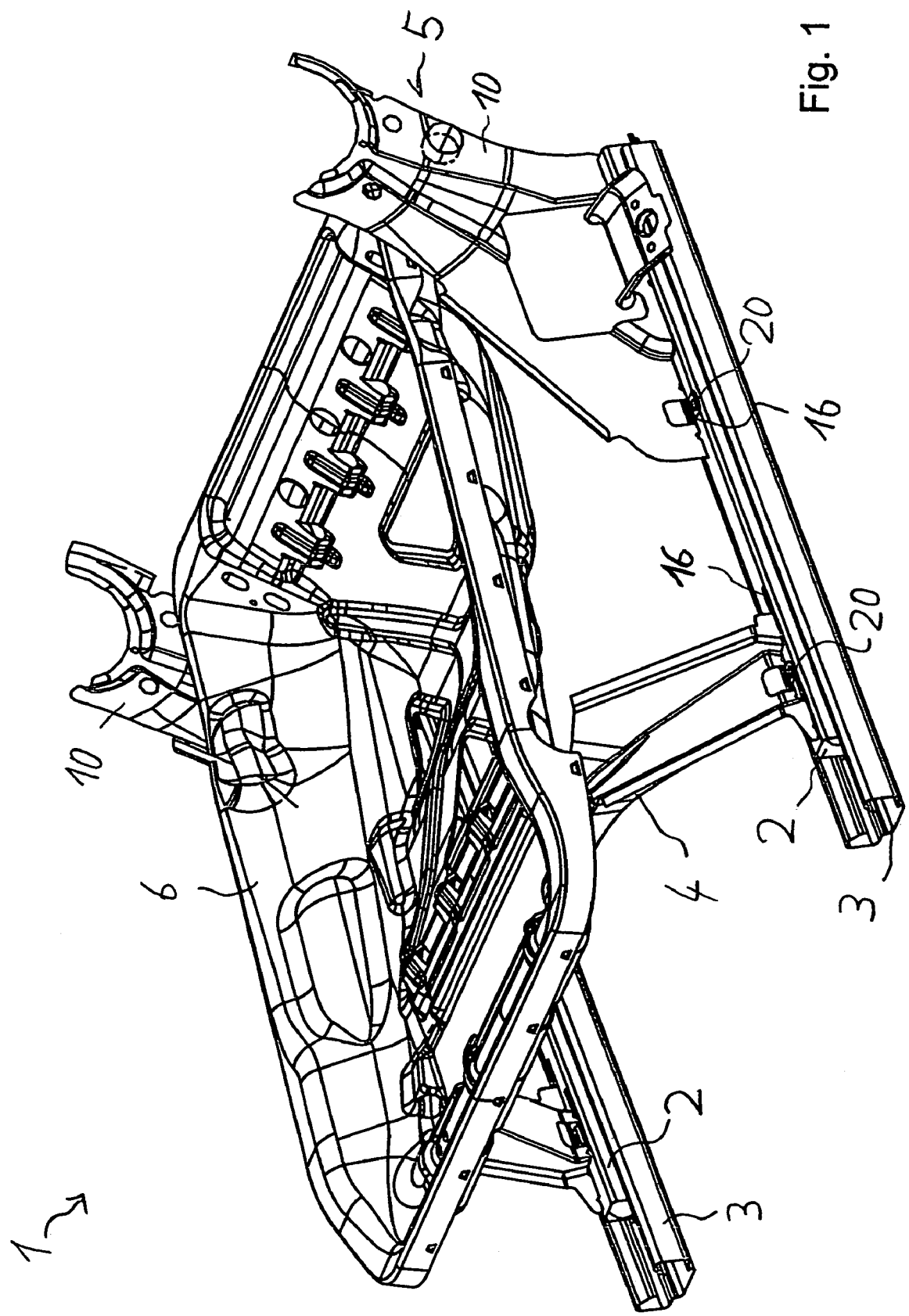
FIG. 1 is a perspective front view of the inventive seat structure.

A seat structure 1 of a motor vehicle seat includes, among other components, two upper rails 2, which are engaged displaceably in a longitudinal direction on lower rails 3 mounted fixedly to the motor vehicle, a front crossbeam 4 and a rear crossbeam 5 as well as a seat pan 6 mounted on the crossbeams 4, 5. Disposed on each side of the front crossbeam 4 are three insertion tabs 8, which project straight down. The rear crossbeam 5 includes a transverse pipe 9, to the ends of which adapter pieces 10 are welded, each of which includes three rear insertion tabs 12 projecting directly downward. Disposed on the right side—in the direction of travel—a connection 13 for a seat belt tensioner is provided on adapter piece 10, while the left side adapter piece 10 correspondingly includes a connection 14 for a seatbelt housing, and both of which can be welded on.

On the top surface of upper tracks 2 six longitudinal slots 16 are provided, namely three forward longitudinal slots 16 for the front insertion tabs 8 of the forward crossbeam 4 and three rear longitudinal slots 16 for the rear insertion tabs 12 of the adapter piece 10. In this manner the rearmost longitudinal slot 16 can extend to the rearmost edge of the upper track 2.

The three longitudinal slots 16 are realized in two rows disposed in lateral relation to one another. That is, a longitudinal slot 16 is located offset relative to the two other longitudinal slots 16. The insertion tabs 8 and 12 each include a forward opening notch 8a and 12a, respectively. The three insertion tabs 8 and 12 are disposed in lateral relation to one another corresponding to the slots 16, so that a high level of stability is achieved when they are introduced into the slots 16.

The insertion tabs 8 and 12 are inserted straight down into the longitudinal slots 16 via their blade-like lower flanges 8b and 12b, which extend downward and forward below the notch 8a and 12a, and are then shifted forward so that the respective notches 8a and 12a catch the upper rails 2. The upper rails 2 are thereby engaged in the notch 8a and 12a, respectively, between the lower flanges 8b and 12b, respectively, and the upper flanges 8c and 12c, respectively, so that the crossbeams 4 and 5 are already fixed into position transversally and vertically. Longitudinal anchoring is provided by rivets 20, which are inserted vertically on each side through folded tabs 21 of the crossbeam 4 and 5 and openings in the upper rails 2.

Figure 2:
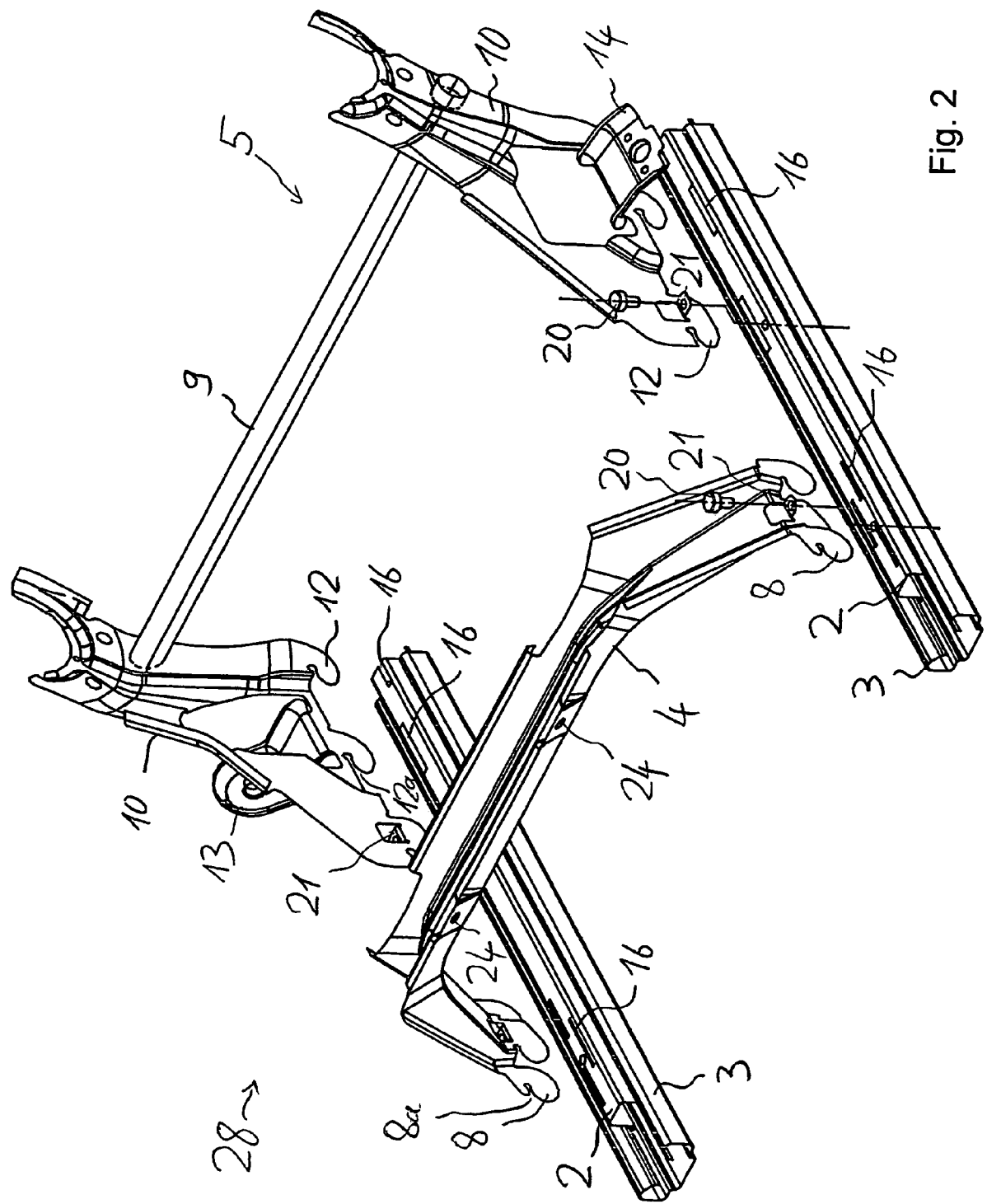
FIG. 2 is a perspective front view of the assembly of the crossbeam of the seat frame in the upper rails.
Figure 3:
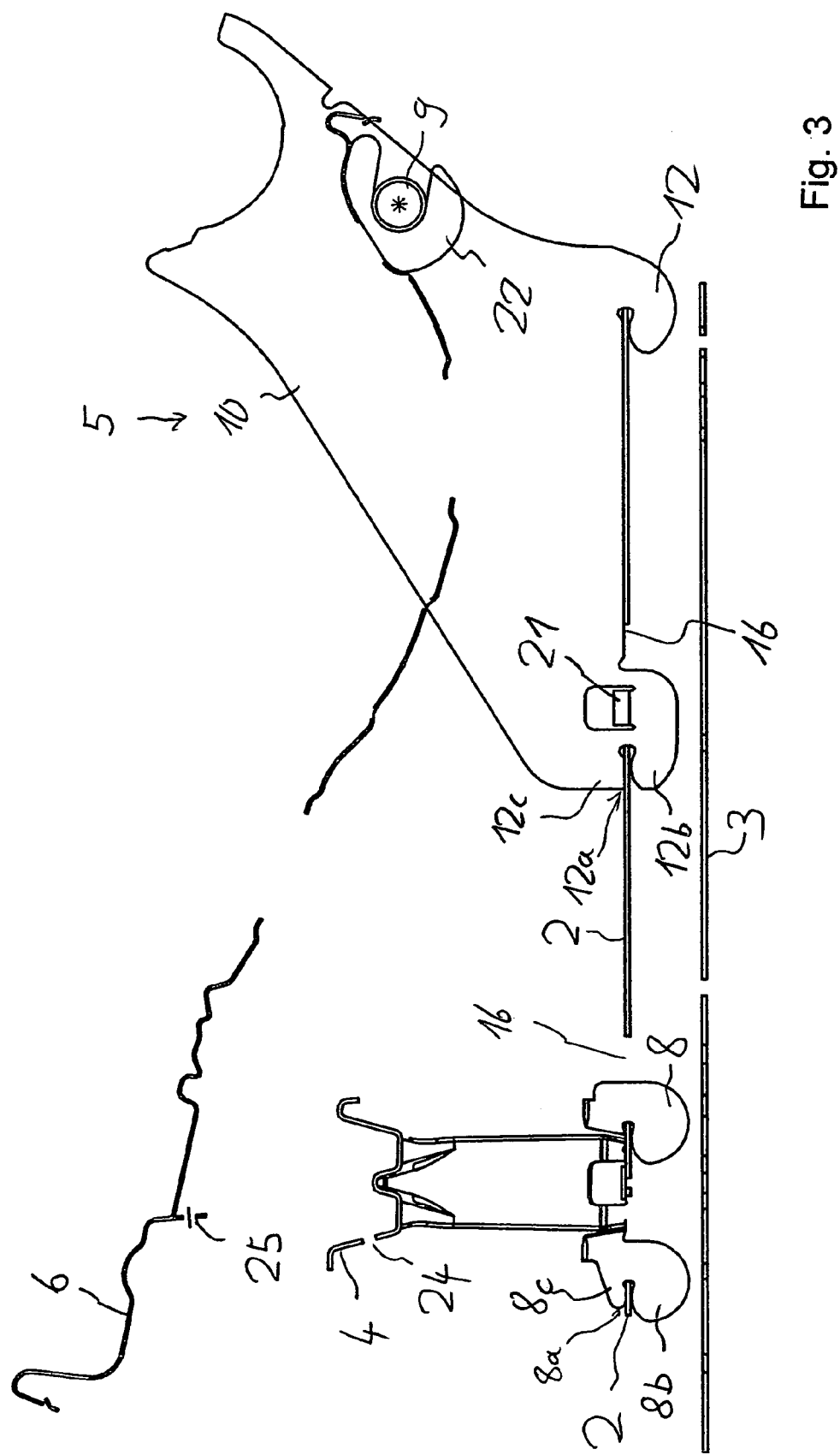
FIG. 3 is a view of the subsequent mounting of the seat pan on the crossbeams shown in longitudinal section.
Figure 4:
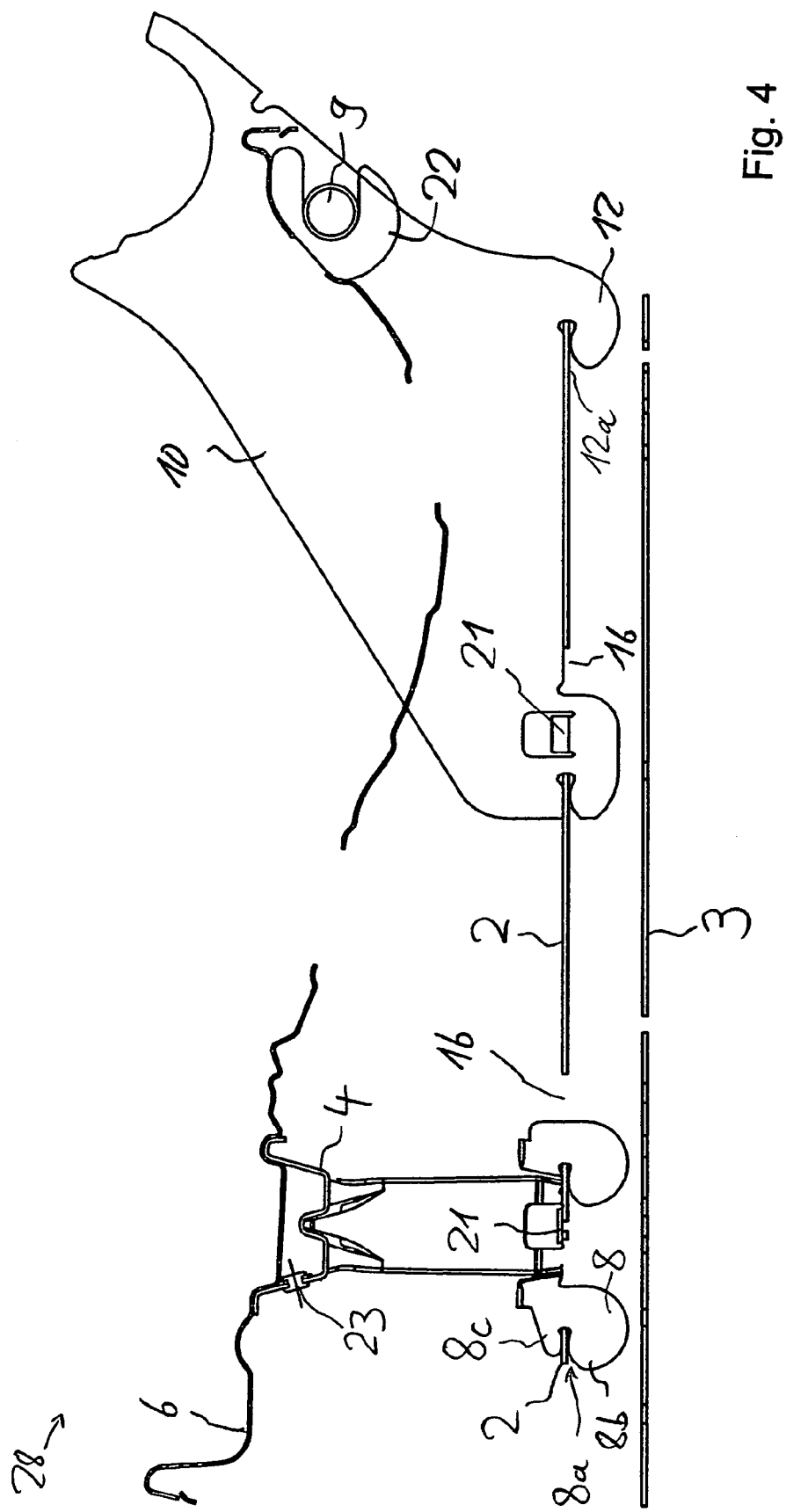
FIG. 4 is a view of the seat structure with a fully assembled and mounted seat pan as shown in FIG. 1 in longitudinal section.
Figure 5:
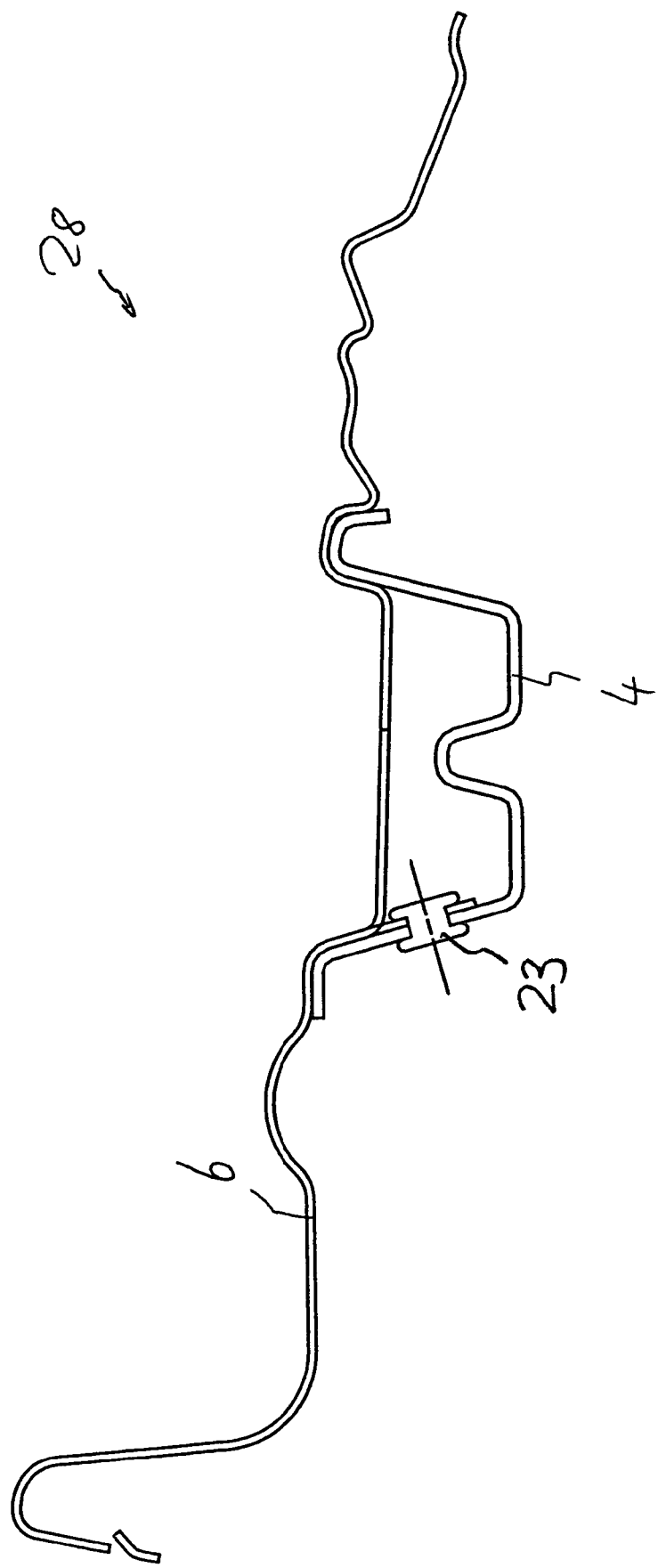
FIG. 5 is a partial detail of FIG. 4.

To assemble seat structure 1, the forward crossbeam 4 and rear crossbeam 5 are first secured on the upper rail 2 as shown in FIG. 2. The seat pan 6 is then mounted on the crossbeam 4 and 5. For this purpose the seat pan 6, as the longitudinal section in FIG. 3 shows, has two laterally placed flanges 22 with rear openings, which are mounted on the transverse pipe 9. The seat pan 6 is pivoted about the transverse pipe 9 downwardly until its forward section comes to rest on the forward crossbeam 4, whereupon two rivet connections are made, wherein rivets 23 are inserted through openings 24 present in the forward crossbeam 4 and corresponding openings 25 in the seat pan 6.

The assembly of seat frame 28 consisting of crossbeam 4, 5 along with the adapter pieces 10 and insertion tabs 8, 12 as well as the seating pan 6 is thereby completed. A backrest can then be mounted on the adapter pieces 10.

In principle other positive fit attachments, e.g. threaded fasteners, can be used in place of rivets 20 and 23. While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central includes hereinbefore set forth, and fall within the scope of the invention or limits of the claims appended hereto.

The invention claimed is:
1. Seat structure for a vehicle seat, comprising:
   a) upper rails, the upper rails extending in a longitudinal direction and being longitudinally displaceable in relation to lower rails mountable fixedly to a motor vehicle, and the upper rails including longitudinal slots;
   b) a seat frame, the seat frame including insertion tabs, which are inserted into the longitudinal slots of the upper rails;
   c) the seat frame including front and back crossbeams, on which the insertion tabs are provided;
   d) at least one of the insertion tabs including a notch, and the notch engages the upper rail and fixes it vertically;
   e) the front and rear crossbeams being secured to the upper rails in the longitudinal direction;
   f) the front and rear crossbeams being configured for mounting and securing a seat pan;
   g) the front and rear crossbeams being secured to the upper rails by a positive fit attachment; and
   h) the positive fit attachment being inserted vertically through the crossbeams and the upper rail.
2. Seat structure as claimed in claim 1, wherein:
   a) the notch of the insertion tabs opens forwardly and the insertion tabs are shifted forwardly in the longitudinal direction on the upper rail.
3. Seat structure as claimed in claim 1, wherein:
   a) the positive fit attachment includes a rivet.
4. Seat structure as claimed in claim 1, wherein:
   a) on each side the crossbeams include at least two insertion tabs displaced laterally from one another.
5. Seat structure as claimed in claim 1, wherein:
   a) on each side the crossbeams include three insertion tabs of which two are disposed in tandem arrangement, while the third is placed laterally thereto.
6. Seat structure as claimed in claim 1, wherein:
   a) a seat pan is mounted on one crossbeam and fastened to the other crossbeam with a positive fit attachment.
7. Seat structure as claimed in claim 6, wherein:
   a) a tubular region is provided on one of the crossbeams; and
   b) the seat pan has flanges, via which the seat pan is mounted onto the tubular region of one of the crossbeams and then pivoted downward about the tubular component.
8. Process for assembling a seat structure of a vehicle seat, comprising:
   a) inserting front insertion tabs of a front crossbeam and rear insertion tabs of a rear crossbeam into longitudinal slots present on longitudinally displaceable upper rails
   b) shifting of the front and rear crossbeams longitudinally on the upper rails in such a manner that notches of the front and rear insertion tabs engage the upper rails and fix them in a vertical position;
   c) anchoring the front and rear crossbeams longitudinally through formfitting fasteners;
   d) mounting and securing of a seat pan on the front and rear crossbeams;
   e) the seat pan being mounted atop one of the front and rear crossbeams and subsequently pivoted downward about the one crossbeam and fastened to the other one of the front and rear crossbeams with a positive fit attachment; and
   f) rivets being used as the positive fit attachment.
9. Seat structure as claimed in claim 1, wherein:
   a) the front and rear crossbeams are secured to the upper rails by a fastener.

10. Seat structure for a vehicle seat, comprising:
a) upper rails, the upper rails extending in a longitudinal direction and being longitudinally displaceable in relation to lower rails mountable fixedly to a motor vehicle, and the upper rails including longitudinal slots;
b) a seat frame, the seat frame including insertion tabs, which are inserted into the longitudinal slots of the upper rails;
c) the seat frame including front and back crossbeams, on which the insertion tabs are provided;
d) at least one of the insertion tabs including a notch, and the notch engages the upper rail and fixes it vertically;
e) the front and rear crossbeams being secured to the upper rails in the longitudinal direction;
f) the front and rear crossbeams being configured for mounting and securing a seat pan;
g) the front and rear crossbeams being secured to the upper rails by a positive fit attachment; and
h) the positive fit attachment including a rivet.

11. Seat structure as claimed in claim 10, wherein:
a) the notch of the insertion tabs opens forwardly and the insertion tabs are shifted forwardly in the longitudinal direction on the upper rail.

12. Seat structure for a vehicle seat, comprising:
a) upper rails, the upper rails extending in a longitudinal direction and being longitudinally displaceable in relation to lower rails mountable fixedly to a motor vehicle, and the upper rails including longitudinal slots;
b) a seat frame, the seat frame including insertion tabs, which are inserted into the longitudinal slots of the upper rails;
c) the seat frame including front and back crossbeams, on which the insertion tabs are provided;
d) at least one of the insertion tabs including a notch, and the notch engages the upper rail and fixes it vertically;
e) the front and rear crossbeams being secured to the upper rails in the longitudinal direction;
f) the front and rear crossbeams being configured for mounting and securing a seat pan;
g) a seat pan being mounted on one crossbeam and fastened to the other crossbeam with a positive fit attachment;
h) a tubular region being provided on one of the crossbeams;
i) the seat pan having flanges, via which the seat pan is mounted onto the tubular region of one of the crossbeams and then pivoted downward about the tubular component;
j) the tubular region including a transverse pipe on the rear crossbeam, and to lateral ends of which are secured adapter pieces, on which rear insertion tabs are present;
k) the seat pan being mounted onto the transverse pipe via its rear flanges and is then fastened to the forward crossbeam; and
l) the adapter pieces including a connection for a seatbelt tensioner and/or a connection for a seatbelt housing.

13. Seat structure as claimed in claim 12, wherein:
a) on each side the crossbeams include at least two insertion tabs displaced laterally from one another.

14. Process, as claimed in claim 8, wherein:
a) the rivets used as the positive fit attachment are inserted vertically through the front and rear crossbeams and the upper rails.

* * * * *